(12) United States Patent
Panigrahi et al.

(10) Patent No.: US 11,366,470 B2
(45) Date of Patent: Jun. 21, 2022

(54) SELF-BALANCING AUTONOMOUS VEHICLE FLEET

(71) Applicant: Ford Global Technologies, LLC, Dearborn, MI (US)

(72) Inventors: Smruti Panigrahi, Farmington Hills, MI (US); Justin Miller, Berkley, MI (US); Sanghyun Hong, Ann Arbor, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 256 days.

(21) Appl. No.: 16/588,730

(22) Filed: Sep. 30, 2019

(65) Prior Publication Data

US 2021/0096564 A1  Apr. 1, 2021

(51) Int. Cl.
| | |
|---|---|
| *G05D 1/00* | (2006.01) |
| *G01C 21/36* | (2006.01) |
| *H02J 7/00* | (2006.01) |
| *B60L 53/66* | (2019.01) |
| *B60L 53/64* | (2019.01) |

(52) U.S. Cl.
CPC ............ *G05D 1/0088* (2013.01); *B60L 53/64* (2019.02); *B60L 53/66* (2019.02); *G01C 21/3605* (2013.01); *H02J 7/0027* (2013.01)

(58) Field of Classification Search
CPC .................................................. G05D 1/0088
See application file for complete search history.

(56) References Cited

U.S. PATENT DOCUMENTS

| | | | | |
|---|---|---|---|---|
| 9,381,916 | B1* | 7/2016 | Zhu | G01S 13/867 |
| 2010/0256846 | A1* | 10/2010 | Shaffer | G06Q 10/06 |
| | | | | 701/22 |
| 2016/0104486 | A1* | 4/2016 | Penilla | G10L 15/22 |
| | | | | 704/232 |
| 2018/0101179 | A1* | 4/2018 | Louey | G05D 1/0274 |
| 2019/0217735 | A1* | 7/2019 | Donnelly | G05D 1/0088 |
| 2019/0265059 | A1* | 8/2019 | Warnick | G08G 1/20 |
| 2020/0151631 | A1* | 5/2020 | Lamers | G06Q 10/06311 |
| 2020/0183418 | A1* | 6/2020 | Wang | G05D 1/0287 |

(Continued)

FOREIGN PATENT DOCUMENTS

| | | | | |
|---|---|---|---|---|
| CN | 113228092 | A * | 8/2021 | G06Q 30/0255 |
| DE | 102012214598 | A1 * | 6/2013 | B60L 15/2045 |

*Primary Examiner* — Jean Paul Cass
(74) *Attorney, Agent, or Firm* — Brandon Hicks; Eversheds Sutherland (US) LLP

(57) ABSTRACT

Autonomous vehicle fleet management systems are provided herein. An example method includes receiving, via a control module of a first electric vehicle, trip characteristics data associated with a second electric vehicle. The trip characteristics data includes information such as vehicle location, a trip destination, and a route plan associated with the second electric vehicle. The control module or a connected control server selects a charging station for recharging the first electric vehicle based at least in part on the trip characteristics data and at least one route optimization option associated with the first electric vehicle. The example method further includes determining a travel route to the charging station and navigating the first electric vehicle to the charging station along the travel route using an autonomous vehicle navigation system associated with the control module.

15 Claims, 4 Drawing Sheets

(56) References Cited

U.S. PATENT DOCUMENTS

| | | | |
|---|---|---|---|
| 2020/0387157 A1* | 12/2020 | Bosma | G01C 21/3652 |
| 2021/0027214 A1* | 1/2021 | Bromwich | G06Q 50/30 |
| 2021/0053557 A1* | 2/2021 | Costa | B60W 30/09 |
| 2021/0070294 A1* | 3/2021 | Hong | B60W 30/18 |
| 2021/0080953 A1* | 3/2021 | Kuo | A61G 3/061 |
| 2021/0095978 A1* | 4/2021 | Letwin | B60L 53/36 |
| 2021/0096564 A1* | 4/2021 | Panigrahi | G06Q 50/30 |
| 2021/0124348 A1* | 4/2021 | Hyde | G01C 21/20 |

\* cited by examiner

SELF-BALANCING AUTONOMOUS VEHICLE FLEET

TECHNICAL FIELD

The present disclosure relates to autonomous vehicle fleet management and more particularly to self-distributing autonomous electric scooters operating as a vehicle fleet.

BACKGROUND

Short-distance transportation using personal transport vehicles such as electric scooters are sometimes more convenient than traditional (full sized) automobiles in densely populated urban environments. Although the small footprint of the devices may increase their utility for personal transportation, it may be challenging to manage a fleet of electric scooters due to charging requirements and distribution. For example, the electric scooters may not be positioned in optimal locations due to traffic patterns, and may be left at charging locations that do not have availability for charging due to overcrowding.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components, although contemplated, may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
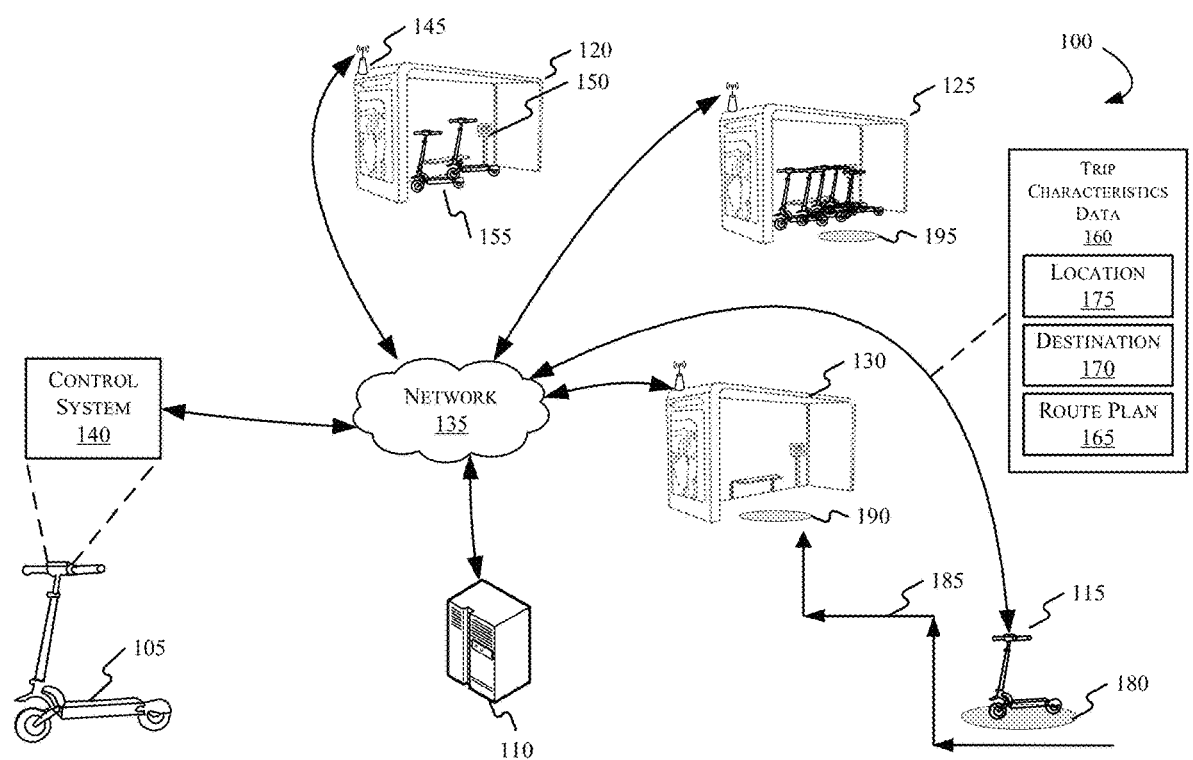
FIG. 1 depicts an illustrative architecture in which techniques and structures for providing the systems and methods disclosed herein may be implemented.

The systems and methods disclosed herein are directed to automation and control techniques for autonomous electric scooters operating concurrently as a coordinated fleet or "swarm" to achieve self-balanced distribution of vehicle placement at charging stations within a bound geographic region (also referred to as a geo-fence). Swarming techniques may involve vehicle agents operating both as part of the coordinated collective fleet determining and transmitting information indicating various states and concurrently operating as individual agents in the swarm, through agent-to-agent communication or through a centralized management system. The electric scooters in the fleet may alternate between operator manual control mode and autonomous modes based on factors such as network latency, or to allow the scooter to autonomously self-manage position, charge its batteries, redistribute itself to another charging location, or perform other autonomous human-independent duties. For example, in one example embodiment, the system (remote server control center) may cause vehicles to switch from manual control to autonomous mode as a safety feature to avoid injury of a rider of the vehicle or other persons, or injury to another vehicle when the onboard control system determines high signal latency.

Vehicles in the coordinated fleet may be equipped with onboard control systems that can transmit trip characteristics associated with vehicles in the fleet including, for example, a current location, a destination of a current trip, and a route plan for a particular trip. The trip characteristics may also include operational mode information such as whether the vehicle is traveling in a free (not occupied) autonomous mode for performing independent vehicle self-maintenance or other duties, a passenger mode, and/or a cargo mode. A remote server functioning as a control center for the electric scooter fleet may distribute the trip characteristics using wireless communication techniques to other electric scooters in the swarm in substantially real-time. Vehicle-to-vehicle communication is also possible and is contemplated. Any neighboring electric scooters in free autonomous mode may then automatically adjust their location based on receipt of the trip characteristics and other factors, such as predicted future demand for available vehicles, by redistributing themselves, if necessary, to other locations within the geo-fence area, to avoid overserving one charging station while underserving the other charging stations.

Embodiments may also include charging stations located throughout the geo-fence area operating environment that may be equipped with sensors to detect available charging positions at respective charging ports within the charging stations. The charging stations may relay this information to the fleet, directly to the vehicles and/or through the centralized server.

In a collaborative electric scooter framework, the system controller onboard the scooters in autonomous mode may be equipped with various rider-selectable optimization tools delivered through an interface on the vehicle. The optimization options may provide selectable tools to minimize travel distance, time, or the number of required vehicle transfers. The optimization tools may also provide selectable optimization tools for minimizing commute time and controlling power options that can maximize battery life or provide additional power and/or speed in lieu of power.

The control system may present various user-selectable options to the customers through a mobile phone application and/or the electric scooter's control panel for selection by the user before starting a journey. For "minimizing power consumption" and "minimizing commute time" options, the user is directed to different electric scooters along the chosen route for transfer options depending on the distance to the destination and charge level of the electric scooter currently in use. In the "optimum utilization" option, the task is distributed within the fleet so as to optimize the battery life of the respective electric scooters, optimize full utilization of the available slots in charging stations distributed within the geo-fenced area, and optimize vehicle placement for predicted future demand.

To encourage selection of options that place the electric vehicles in locations that optimize utility based on demand, the system may present different pricing structures for different options. For example, if the customer chooses to conserve battery life, the customer may receive a discount as a reward for supporting overall fleet optimization. In addition to incentives for optimizing acts, the vehicles in the fleet may independently control their own redistribution, provide information about open charging ports to other vehicles in the fleet, provide optimization options for riders, and/or allow the riders to transition between different electric scooters along a route depending on the optimization option selection. For example, if attaining a particular route destination would exceed the remaining operational capacity of a power cell on a particular scooter currently in use by the rider, the rider may navigate from charging station to charging station as needed to retrieve an alternate, fully charged vehicle while navigating to the target destination. Moreover, the price structure can also be market-driven such that varying price structures may be applied to destinations that show increased vehicle demand at particular times.

Through swarming, a fleet of autonomous electric scooters can optimize utilization by continuously maintaining vehicles where demand is shown to be highest, in conditions that the customers desire. This can be accomplished by individual control systems on scooters in the fleet acting as agents to communicate with each other to ensure that workload and usage of the vehicles is continuously rebalanced by the fleet. The rebalancing may be based on dynamically changing information in real time such as vehicle locations, rider intentions for vehicle use, intended and realized route plans, and predicted future demand associated with geographic locations at future periods of time. These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

As illustrated in FIG. 1, an operating environment 100 may include a plurality of autonomous vehicles, such as, for example, an autonomous scooter 105 and an autonomous scooter 115. The vehicles described herein may operate as part of a coordinated fleet (or "swarm") by communicating with one another directly as well as through a centralized control server 110. For example, the autonomous scooters 105 and 115 may be in communication with one or more servers 110 as well as with other scooters that are currently idle, but which remain connected to the fleet. For example, scooters that are at charging stations may be connected to the fleet while in a charging mode.

FIG. 1 depicts a plurality of charging stations 120, 125, and 130, which may be located at various geographic locations within a geo-fenced operating environment, which may embody any reasonable geographic area including a city, town, campus, etc. For example, the charging stations 120, 125, and 130 may be located within a city where the geographic boundary is the city limit, a limited portion of the city, or even the boundary of a campus within the city. In some embodiments, the autonomous scooters 105, 115, etc., may communicate with any one of the one or more charging stations 120, 125, and 130 directly and/or indirectly through a shared network 135.

The network 135 illustrates an example of one possible communication infrastructure in which the connected devices may communicate. The network 135 may be the Internet, a private network, public network or other configuration that operates using any one or more known communication protocols such as, for example, TCP/IP, Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. The autonomous scooters 105 and 115 may also communicate independently of the network 135, using one or more vehicle-to-vehicle communication protocols. An example of a vehicle-to-vehicle communication protocol may be, for example, the dedicated short-range communication (DSRC) protocol.

The autonomous scooter 105 may include a control system 140 that may be configured or programmed to receive messages from and/or transmit messages to the server 110 and/or other vehicles in the fleet such as, for example, the autonomous scooter 115. As explained in greater detail hereafter with respect to FIG. 2, the control system 140 may include processing and sensing capability of the scooter for full autonomous operation and/or partial autonomous operation that provides control for independent navigation within the operating environment 100 with or without control input from a human rider.

The control system 140 may communicate with the charging stations 120, 125, and 130 either directly and/or using the network 135. Moreover, the computing and decision making capabilities may be distributed in the geo-fenced operating environment 100 such that the server 110 may provide computational support to the fleet, and/or the onboard scooter control systems may independently (that is, without computational support from the server 110) provide route management and communication between the vehicles in the fleet. Stated another way, this disclosure may also be practiced using a distributed system environment where the server 110 and other remote computing systems (not shown in FIG. 1) are linked together either by hardwired data links, wireless data links, or by any combination of hardwired and wireless data links to perform the tasks described herein. When configured as a distributed system environment, program modules associated with aspects of the present disclosure may be located in both the memory associated with the server 110 and/or on memory storage devices associated with vehicles in the fleet and control systems, such as a memory unit 255 (described with respect to FIG. 2 hereafter). For example, computational responsibility for selecting charging stations for recharging the electric vehicles in the fleet, evaluating trip characteristics data associated with other vehicles in the fleet, performing optimization calculations and statistical analyses for demand planning, etc., may be performed by the control system 140 of a scooter, by the server 110, and/or a combination thereof.

The charging stations, 120, 125, and 130 may include a charging station controller configured and/or programmed to evaluate information associated with scooters that may be in use. For example, the autonomous scooter 105 and the autonomous scooter 115 may be in periodic or continuous communication with the charging station 120, and more particularly, in communication with the charging station controller 150. In addition, the charging station 120 may communicate with scooters that may not be in use but are connected with the fleet such as, for example, the charging scooters 155 that are depicted as charging in the charging station 120. The charging station 120 may communicate directly with a scooter using a vehicle-to-vehicle communication protocol, and/or communicate via a central controlling mechanism operational as part of the server 110.

In some example embodiments, the charging station controller 150 may evaluate charging capacity for the charging station 120 and transmit the information to the server 110 and/or the autonomous scooters 105, 115, etc. operating as part of the fleet. The charging stations 120, 125, and 130 may include communication devices such as, for example a wireless transmitter 145 that may be configured to provide wireless communication with the server 110 and/or one or more of the autonomous scooters 105 and 115.

Although illustrated as a two-wheeled electric scooter, the autonomous scooter 105 may include other types of autonomous electric transportation devices such as, for example, vehicles having any number of wheels, personal mobility vehicles, etc. One example of such a vehicle is described in U.S. Patent Application Publication No. 2018/0101179 (hereafter "the '179 publication"), assigned to Ford Global Technologies LLC and incorporated herein by reference. The '179 publication describes an autonomous personal mobility system that can operate within a geo-fenced environment similar to the operational environment 100 of FIG. 1. The '179 publication describes a fleet of autonomous three-wheeled vehicles having a navigation system configured to provide autonomous point-to-point navigation within a specified geographic area. The autonomous scooters 105 and 115, among others, may be substantially similar or identical to the vehicles described in the '179 publication in design and/or functionality, and more particularly, in control system configuration.

Individual charging station locations may experience traffic patterns that vary by day, time, season, and other factors. It is the aim of any provider of transportation vehicles and devices intended for public use that the vehicles be used in a way that maximizes utility for its customers, as well as in a way that maximizes profit and/or other goals of the service provider. It can be advantageous, therefore, to observe and evaluate data collected by the server 110 and/or vehicles in the fleet to predict usage patterns according to observed patterns of use by customers. Statistical and machine learning techniques, and more specifically, supervised machine learning techniques, may provide insights when combined with usage data obtained and shared among vehicles in the geo-fenced operating environment 100.

Although outside of the scope of the present disclosure, it should be appreciated that machine learning analytics and optimization techniques using training datasets are known in the art, and may provide analytical predictions for electric scooter demand at future times, locations, and in view of other factors such as weather conditions, date, seasonal conditions, etc. Training data may include vehicle telematics and trip characteristics data that may be compiled, aggregated, and processed by the server 110. This can be done by transmitting vehicle use information that indicates vehicles in use, the intended destination for the vehicles, and modes of transport such as whether they are currently self-controlled in autonomous mode, partially autonomous mode, and other possible information. Trip characteristics data 160 depicts an example set of information that the vehicle control system 140 may share with other vehicles in the fleet and with the centralized server.

In one example embodiment, two autonomous scooters 105 and 115 may operate simultaneously in the operational environment 100. Specifically, the first autonomous scooter, which is not currently deployed, (e.g., the autonomous scooter 105) may be ready for a recharge operation, and thus, in the position to select a recharging station. Further, the second autonomous scooter (e.g., the autonomous scooter 115), while deployed and traveling along its scheduled route, may transmit the trip characteristics data 160 to the server 110 and/or to other scooters in the geo-fenced operating environment. The trip characteristics data 160 may describe characteristics specific to the second autonomous scooter 115, and more particularly, specific to a current trip on which it is deployed. The trip characteristics data 160 may include, for example, route plan information 165, which may indicate a route 185 taken and/or scheduled for the autonomous scooter 115. The trip characteristics data 160 may further include destination information 170, which may indicate a target destination 190 for the autonomous scooter 115. The trip characteristics data may further include location information 175, which may indicate an approximate or present location 180 of the autonomous scooter 115. Other information is contemplated, and thus, the present example should not be considered limiting. The server 110 and/or other vehicles in the operating environment 100, such as the autonomous scooter 105, may receive the trip characteristics data 160 in real-time or substantially real-time from the autonomous scooter 115, and use that information, among other available data, to select a charging station that supports redistribution of both scooters 105 and 115 in the operational environment. For example, the first autonomous scooter 105 may select a charging station (one of the charging stations 120, 125, and 130) for recharging based, at least in part, on the received trip characteristics data 160 from the scooter 115. The selection may be further based on other information indicative of user-selected options, such as one or more route optimization options and/or one or more vehicle operation modes, among other options.

In one example embodiment, the autonomous scooter 115 may transmit the trip characteristics data 160 to the server 110 as it travels along the route 185. The autonomous scooter 115 may also send the trip characteristics data 160 to any or all of the other scooters in the operating environment 100 in substantially real-time. One or more other autonomous scooters in the fleet (e.g., the autonomous scooter 105) may then automatically adjust its intended destination by redistributing itself, if necessary, to another charging station within the geo-fence area to avoid overserving one station while underserving the others.

For example, the charging station 125 may transmit information to the autonomous scooters 105 and 115, either directly and/or via the server 110, that the charging station 125 is at or over capacity for available recharging docks and cannot currently accommodate new scooters in the charging docks of that station. At the same time, the charging station 130 may also transmit information to the autonomous scooters 105 and 115, either directly and/or via the server 110, that the charging station 130 has recharging dock capacity available to receive additional scooters in need of recharge. In one example, if the destination 195 adjacent to the charging station 125 (which is currently at/over capacity) is currently indicated as a target destination for one or more of the autonomous scooters 105 and 115, the server 110 and/or the autonomous scooters 105 and 115 may receive the trip characteristics data 160 and the capacity information associated with the charging stations 125 and 130, and subsequently direct the en route autonomous scooter 115 to the target destination 190 adjacent to the charging station 130 in lieu of the charging station 125. Specifically, the autonomous scooter 115 may navigate to the charging station 130 along a route 185 using the autonomous vehicle navigation system associated with the control module onboard the electric scooter 115.

In yet another embodiment, one or more charging scooters 155 from a first charging station 120 may receive capacity information associated with another charging station (e.g., the third charging station 130) and redistribute available autonomous scooters in the fleet by one or more scooters self-navigating from the first charging station 120 to the third charging station 130. Self-rebalancing may be a feature associated with a free operation mode of the autonomous scooters, described in greater detail hereafter.

Transportation mode options may be self-selected by the autonomous scooter, the server 110, and/or customers interacting with the scooters. For example, the scooter control system 140 can present one or more operational options to customers through a mobile phone app (not shown in FIG. 1) and/or through an onboard dedicated interface device on the scooter (described hereafter with respect to FIG. 3). In one embodiment, the customer may select operational mode options before starting the journey. Example options can include "minimizing power consumption" and "minimizing commute time," where the user is directed to different points along the route for scooter transfers depending on the distance to the destination and charge level of the electric scooter. A different pricing structure can also be applied to each transportation mode option. For example, if the customer chooses to conserve battery life, they may receive a discount.

When the electric scooter is checked-out by a customer, the control system 140 may present transportation mode options for customer selection. The customer may choose both the destination and the desired mode of operation, which may include passenger options and package delivery options (without a human rider). In the "package/cargo mode," the scooter 105's operation may be completely autonomous, such that the scooter 105 navigates to the delivery location(s) without human intervention. In a passenger mode, the customer can choose between manual, autonomous, and semi-autonomous scooter operation. In "manual mode," the rider may freely configure operation of the scooter. In a "semi-autonomous mode," certain safety features may be enabled such as, for example, collision avoidance, speed control, steering, and/or other configurable options. In "semi-autonomous mode," the electric scooter may assume control of the braking, accelerating, and/or steering when it senses danger or obstacles through its sensing autonomous navigation controller (described in greater detail with respect to FIG. 2). In "free mode", the electric scooter may not be in customer use and can perform tasks autonomously. For example, the control system 140 may continuously check the scooter's available battery energy (charge level) at a predetermined frequency (e.g., 0.1 Hz). Once it detects a charge level below a predetermined threshold (e.g., 20% of available charge capacity) the scooter control system 140 may autonomously receive any new trip characteristics data 160 and subsequently navigate the not in use scooter to the nearest available charging station (e.g., one of the charging stations 120, 125, and 130).

Figure 2:
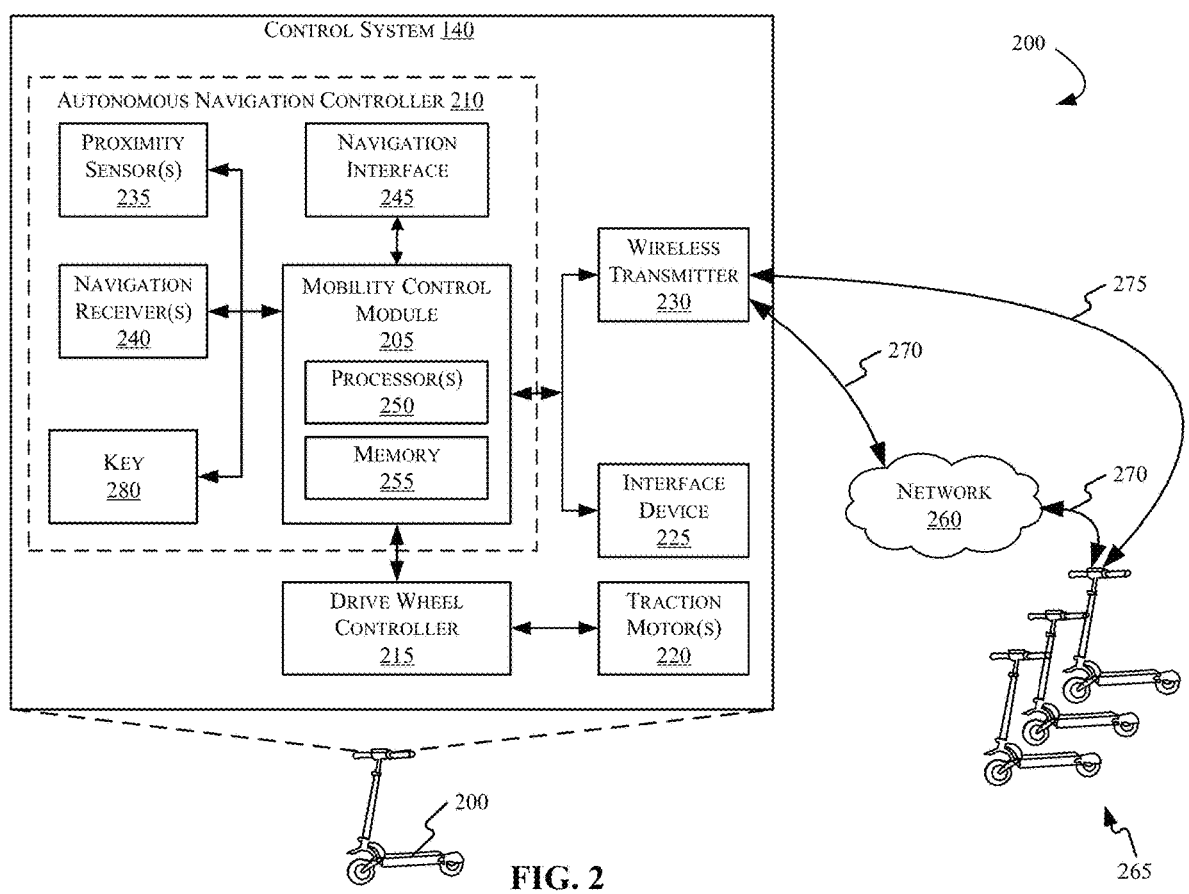
FIG. 2 is a functional schematic of an autonomous scooter control system utilized in accordance with the present disclosure.

FIG. 2 illustrates a functional schematic of an example autonomous navigation controller 210 for an autonomous scooter 200 according to one or more embodiments. The autonomous scooter 200 may be substantially the same or identical to the autonomous scooters 105, 115, and/or 155 described with respect to FIG. 1. A fleet 265 is illustrated in FIG. 2 to represent one or more other autonomous vehicles that may communicate with the autonomous navigation controller 210. Examples of individual vehicles in the fleet 265 can include, for example, the autonomous scooters 105, 115, and/or 155, as well as other vehicles configured and/or programmed to work in conjunction with the autonomous navigation controller 210.

The example autonomous navigation controller 210 may include a mobility control module 205 that may be configured or programmed to evaluate navigation input from sensors and receivers, and perform drive functions by controlling drivetrain components such as a drive wheel controller 215, for example.

The autonomous navigation controller 210 may be configured and/or programmed for aspects of autonomous navigation. The autonomous navigation controller 210 may include one or more proximity sensor(s) 235, one or more navigation receiver(s) 240, and a navigation interface 245 with which users of the autonomous scooter 200 may interact with the autonomous navigation controller 210. For example, riders, customers, or other users may interact with the navigation interface 245 to view route map information, confirm target destinations, review a route plan, provide feedback regarding a proposed route, and/or interact in other ways described herein.

The autonomous navigation controller 210 may communicate information to one or more other vehicles in the fleet using a wireless transmitter 230, which may communicate information using a network 260. The network 260 may be substantially similar to or identical to the network 135 described in FIG. 1. Accordingly, the autonomous navigation controller 210 may be configured and/or programmed to receive messages from and/or transmit messages to a server (e.g., the server 110 in FIG. 1) and/or to and from other vehicles. The autonomous scooter 200 may communicate with one or more other electric scooters in a fleet 265 of electric scooters in various ways, including via an indirect communication channel 270 using the network 260, and/or via a direct communication channel 275, which can connect two or more electric scooters directly without the utilizing the network 260.

The mobility control module 205 may include one or more processor(s) 250, and a memory unit 255. The processor(s) 250 may be one or more commercially available general-purpose processor(s), examples of which can include processors from the Intel® or ARM® architecture families. Although many configurations and architectures are possible and contemplated, it should be appreciated that the mobility control module 205 can be implemented in a system on a chip (SoC) configuration or other architecture, and may include other system components such as random access memory (RAM), flash storage, and input output (I/O) buses (none of which are shown in FIG. 2). Alternatively, the mobility control module 205 can be implemented using purpose-built integrated circuits, or any other suitable technology currently known or yet to be developed.

The mobility control module 205 includes a memory unit 255 that can include any one or a combination of volatile memory elements (e.g., dynamic random access memory (DRAM), synchronous dynamic random access memory (SDRAM), etc.) and can include any one or more nonvolatile memory elements (e.g., erasable programmable read only memory (EPROM), flash memory, electronically erasable programmable read only memory (EEPROM), programmable read only memory (PROM), read only memory, etc.

The autonomous navigation controller 210 may provide route management and communication between one or more other scooters in the fleet 265, generate control prompts for user selection and receive user input. For example, the autonomous navigation controller 210 may receive user input via the interface device 225 to receive user selections indicative of control options, optimizations, and/or destinations while users are operating the vehicle. In some example embodiments, the autonomous navigation controller 210 may receive one or more user input(s) indicative of whether the scooter will be deployed with or without a human rider in a "cargo mode" for the purpose of transporting cargo. The "cargo mode" information may also be indicative of cargo to be transported with the first electric vehicle 200 including, for example, a size, weight, contents, and other information of the cargo.

The mobility control module 205 may connect with one or more drive wheel controller(s) 215, which in turn may operate one or more traction motor(s) 220. The mobility control module 205 may communicate with the drive wheel controller 215 for providing autonomous and/or semi-autonomous vehicle navigation to selected points of interest or waypoints along a selected route. The drive wheel controller 215 may control one or more drive mechanisms such as, for example, one or more brushless direct current (DC) motors, or another traction motor technology.

The navigation receiver(s) 240 can include one or more of a global positioning system (GPS) receiver, and/or other related satellite navigation systems such as the global navigation satellite system (GLNSS), Galileo, or other similar systems known in the art of autonomous vehicle operation.

Additionally, the navigation receiver(s) 240 may be configured and/or programmed to receive navigation cues that aid in precise navigation through space-restricted areas along a route, such as, for example, in a crowded street, and/or in a space-restricted indoor area. When deployed in conjunction with a distributed beacon network (not shown in FIG. 2), navigation cues can include communication with one or more purpose-built location beacons placed throughout a geographic area. For example, in an embodiment, the autonomous navigation controller 210 may receive trip characteristics data associated with another autonomous scooter, where the trip characteristics data includes a vehicle location, a trip destination, and a route plan associated with the second vehicle. In one example embodiment, the route plan may include beacon information indicative of navigating features in a signal-limited environment (e.g., the interior of a metal building or other structure acting as a Faraday cage). The navigation cues from the beacon network may enable an increased level of navigation precision and provide specific indicators for locations of various points of interest along the route. Other applications of a beacon network are possible and contemplated.

The processor(s) 250 may also determine a travel route to charging stations or other destinations and navigate the autonomous scooter 200 to the charging station along the travel route. In other aspects, the navigation receiver(s) 240 may communicate with mobile telephone network infrastructure for cell tower triangulation and use of known-location Wi-Fi hotspots. Any location technology now known or yet to be developed that can provide a high precision location (e.g. preferably within a foot) can be useful as part of navigation receiver(s) 240. In yet other aspects, the processor(s) 250 may receive travel route information determined by one or more other autonomous scooters, and/or by a server such as the server 110 (as shown in FIG. 1).

The proximity sensor(s) 235 may work in connection with the navigation receiver(s) 240 to provide situational awareness to mobility control module 205 for autonomous navigation. For example, the proximity sensor(s) 235 may include one or more cameras for providing optical sensor data, one or more sonar(s) that provide proximity data, trajectory information, velocity vectors, etc., and one or more light detection and ranging (LiDAR) devices for light detection and ranging. The proximity sensor(s) 235 may alert the mobility control module 205 to the presence of sensed obstacles, and provide route plan information to the mobility control module 205, where the route plan information is indicative of navigating around objects or people that may otherwise adversely interact with the autonomous scooter 200. Accordingly, the autonomous navigation controller 210 may compute a safe path towards a destination such that the vehicle avoids collisions. Sensed obstacles can include, for example, other vehicles, pedestrians, animals, structures, curbs, and other objects.

The route plan information received from other scooters in the fleet may include one or more of a route, a destination for the other scooter, a current location of the other scooter, and other information such as speed, rider weight, cargo weight, etc. The mobility control module 205 may receive trip characteristics data associated with other scooters in the fleet 265 and aggregate the information with the data obtained by the navigation receiver(s) 240, to determine the optimal travel routes to the charging stations.

In another aspect, a power consumption option may indicate that a rider wishes to maximize power, for example, to compensate for steep inclines within a particular route, to compensate for a physically large rider, or any other number of factors. Accordingly, the autonomous navigation controller 210 may select a travel route that is shorter in distance, but travels along a steeply inclined road to the charging station.

In another aspect, a rider may provide input that indicates a desired level of vehicle autonomy. For example, the autonomous scooter 200 may include at least two selectable levels of autonomy such that the scooter may operate in a full autonomous mode or a semi-autonomous mode that provides only certain aspects of operation, such as steering of the vehicle and/or object collision avoidance. In one example embodiment, if a rider selects manual operation (no autonomy), or semi-autonomous mode (partial autonomy), the processor(s) may provide the rider with some aspects of control by allowing, for example, throttle control that signals the drive wheel controller 215 to variably control the traction motor(s) 220, steering mechanisms (not shown in FIG. 2), or other aspects. In another example, if the rider wishes to ride the scooter but also concurrently engage in tasks that prevent full attention to vehicle operation, (e.g., enjoy personal media or split their attention to another task, such as reading) the rider may select full autonomy. In such an example, the processor(s) 250 may reserve full control of the drive wheel controller 215 and operate the vehicle independently using the autonomous navigation controller 210. In other embodiments, the customer may not be a rider, but instead selects options for autonomous transport of cargo. In such embodiments, the cargo mode selected may include only full autonomous operation options that reserve full control of the drive wheel controller 215, and operate independently using the autonomous navigation controller 210.

In other aspects, the autonomous navigation controller 210 may automatically change a level of electric vehicle autonomy for the autonomous scooter 200 based on a detected signal latency value that indicates network congestion, poor signal transmission, or other factors that may impede information transmission using the wireless transmitter 230. The navigation controller may determine latency based on known empirical metrics that are measurable in real time, including signal speed, packet loss measurements, round trip time, etc. For example, the server 110 (as shown in FIG. 1) may monitor signal latency and assign full autonomy to the autonomous scooters from a central location. In another embodiment, the control system 140 may determine signal latency and enable full autonomy without external signal inputs from the server 110. In still another embodiment, the vehicle autonomy level may be selectable to cause the mobility control module 205 to change the level of electric vehicle autonomy automatically based at least in part on the signal latency value.

A key 280 may provide customer and/or rider access to the autonomous scooter for operation. The key 280 may be a physical key or may be an identification code or a password entered by a user via a touch screen interface (e.g., the interface device 225). The identification code may be associated with a service provider who rents personal transportation vehicles such as electric scooters, an individual owner of the scooter, a subscriber to multiple vehicles in a fleet associated with the service provider, etc.

Figure 3:
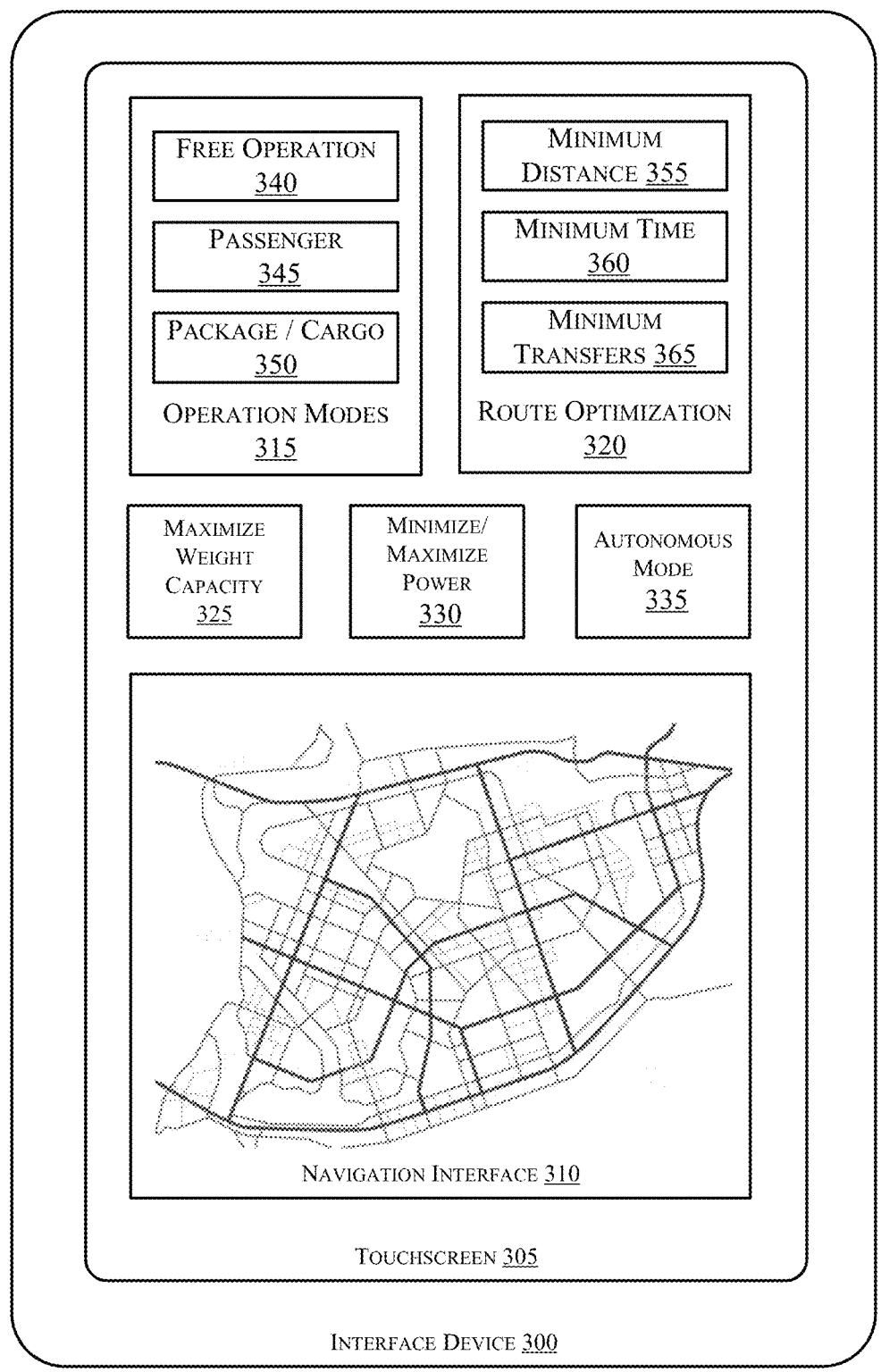
FIG. 3 illustrates an example user interface utilized in accordance with the present disclosure.

FIG. 3 illustrates an example interface device 300 that may be utilized in accordance with the present disclosure. The interface device 300 may be substantially similar or identical to the interface device 225 in FIG. 2. The interface device 300 can include a touchscreen 305 enabled to output operational information such as power consumption information, battery health, battery level, etc., and receive tactile feedback from users that can include touches, selections, swipes, etc. In some embodiments, the interface device 300 may be a permanent feature of the autonomous scooter 200. In other aspects, the interface device 300 may be removable, and/or may be a separate device such as a personal computing device, smart phone, tablet, etc.

Although not depicted as a steering and throttle control mechanism, the touchscreen 305 may provide user interface means for controlling operational aspects of the autonomous scooter, such as breaking, acceleration, etc. The interface device 300, either alone or in conjunction with the navigation interface 310, may output control prompts and more precisely, may receive signals from the mobility control module 205 to output prompts such as "please input your destination," and "please indicate the weight of any cargo for this trip," for example. The interface device 300 may receive operator inputs such as numeric information, button selections, etc., and provide the input signals to the control system 140.

The interface device 300 can include a touchscreen 305, and or other physical input mechanisms such as buttons, switches, etc. (other physical input mechanisms not shown in FIG. 3). The touchscreen 305 is depicted having a navigation interface 310, a plurality of operation modes 315, and a plurality of route optimization options 320. The interface device 300 may further include selectable interface icons or buttons such as a maximum weight capacity button 325 for selecting weight maximization options, a minimize/maximize power button 330 for selecting power use management options that control power use of the electric vehicle, and an autonomous mode button 335 for selecting a desired level of vehicle autonomy.

In some aspects, the operation modes may be selectable by a rider based on how the rider intends to use the scooter. For example, the operation modes 315 may include a free operation button 340 that may indicate that the scooter is available for use by another rider or reserved for private use. In other aspects, a selection of the free operation button 340 may place the autonomous navigation controller 210 in condition to self-perform tasks such as maintenance, battery checking, power level checking, etc. In one aspect, a vehicle in free operation mode may self-navigate to a charging station when the power level reaches a minimum defined threshold level. In another aspect, the autonomous navigation controller 210 may move an autonomous scooter in free operation mode from a first charging station to a second charging station based on a predicted demand for vehicles at a future time.

The operation modes 315 may further include passenger selection mode option 345 and a package/cargo mode option 350 for placing the vehicle in condition to transport and/or deliver cargo. In one example, responsive to a user selection of the package/cargo mode option 350, the autonomous navigation controller 210 may receive one or more instructions having one or more tasks for the autonomous scooter to perform. For example, the autonomous navigation controller 210 may automatically receive information including a delivery address, a delivery recipient, a route, or other information from the server 110 or another vehicle in the fleet 265.

The route optimization options 320 may provide user-selectable options associated with a particular trip, such as, for example, selectable interface icons or minimum distance options button 355 for maximizing possible travel distance, a minimum time management button 360 for minimizing travel time during a trip, and/or a minimum transfer management button 365 that configures the scooter for minimizing the number of transfers needed to get from the start location to the destination location. Other options and buttons are contemplated, and thus, the selectable options shown in FIG. 3 are not meant to be limiting or exclusive of other possibilities.

Figure 4:
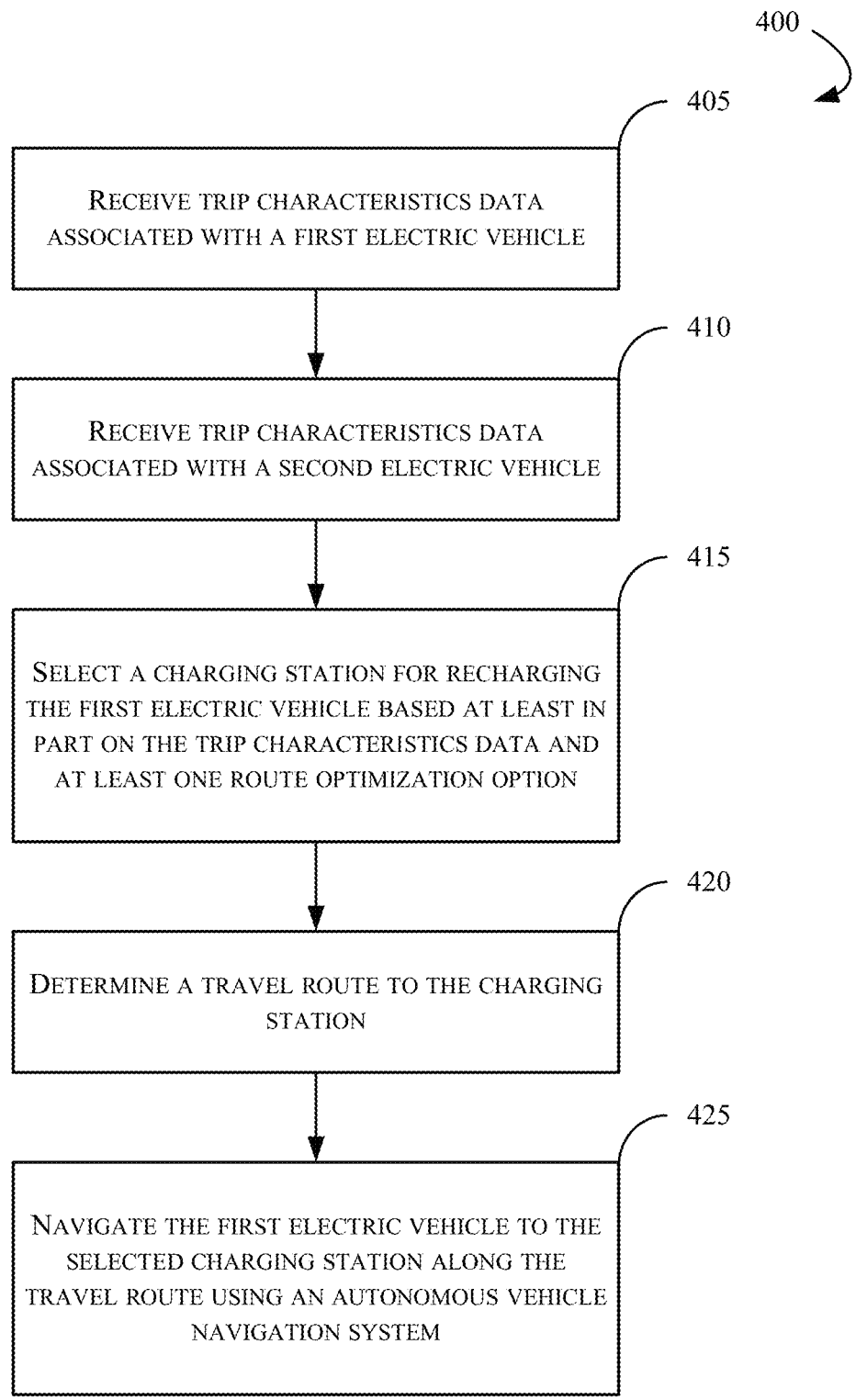
FIG. 4 is a flowchart of an example method of the present disclosure related to voice command isolation from a plurality of competing sound signals.

FIG. 4 is a flowchart of an example method of 400 for self-balancing a network of autonomous electric scooters. In the following section, FIGS. 1 and 2 are discussed in conjunction with FIG. 4. Referring first to FIG. 4, at step 405, a processor such as, for example, the processor(s) 250 (as shown in FIG. 2), may receive trip characteristics data associated with a first vehicle of the managed fleet.

At step 410, the one or more processor(s) 250 may receive trip characteristics data 160 associated with a second electric vehicle in the fleet. In some respects, the characteristics data 160 may include information indicative of one or more of a vehicle location 180, a trip destination 190, and/or a route plan 185 associated with the second autonomous scooter 115. In other aspects, the processor(s) 250 may provide, via an interface device 225 associated with the scooter 200, one or more selectable options for transitioning from the first electric vehicle 200 to a third electric vehicle along the travel route to the charging station, and use the input for determining the route to the charging station.

At step 415, the one or more processor(s) 250 may select a charging station of a plurality of charging stations for recharging the first electric vehicle 200 based at least in part on the trip characteristics data 160 and at least one route optimization option associated with the first electric vehicle 200. In one example embodiment, the route optimization options can include a travel distance minimization option, a travel time minimization option, and a vehicle transfer minimization option.

In another aspect, the one or more processor(s) 250 may further select the charging station based on additional user selections. For example, the processor may provide one or more selectable options managing operational aspects of the scooter via the user interface, and receive input indicative of one or more of a payload maximization option, a power consumption option, and a level of vehicle autonomy of at least two selectable levels of autonomous operation.

At step 420, the processor(s) 250 may select a travel route to the charging station based at least in part on one or more of the user inputs. Selecting the travel route may include determining one or more roads, paths, etc., along which to travel to reach the destination goal. Selecting the travel route may include aggregating the trip characteristics data from one or more other autonomous scooters in the fleet, incorporating information that indicates an operation mode selected by a rider, incorporating any information indicative of a route optimization option selected by the rider, evaluating options selected for weight maximization, power maximization/minimization, and/or autonomy levels for the scooter, and selecting the route.

At step 425, the processor(s) 250 may navigate the first electric vehicle 200 to the selected charging station along the travel route using an autonomous vehicle navigation system (e.g., the autonomous navigation controller 210, as shown in FIG. 2) associated with the control module. Navigating the first electric vehicle 200 to the charging station may include retrieving the selected route from a computer memory (e.g., the memory unit 255 which may be local to the first autonomous vehicle, and/or another computer memory associated with the server 110, or another vehicle) and generating at least one set of instructions for a drive wheel controller onboard the autonomous vehicle to navigate the scooter to the selected charging station destination.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   receiving, via a control module of a first electric vehicle, trip characteristics data associated with a second electric vehicle, the trip characteristics data comprising information associated with the second electric vehicle comprising one or more of a vehicle location, a trip destination, and a route plan, wherein the first electric vehicle and the second electric vehicle are different;
   selecting a charging station of a plurality of charging stations for recharging the first electric vehicle based at least in part on instructions received from a remote server and the trip characteristics data associated with the second electric vehicle and at least one route optimization option associated with the first electric vehicle;
   determining a travel route to the charging station; and
   navigating the first electric vehicle to the charging station along the travel route using an autonomous vehicle navigation system associated with the control module, further comprising:
      receiving, via a user interface associated with the first electric vehicle, a second input indicative of a payload maximization option, a power consumption option and a level of electric vehicle autonomy; and
      changing the level of electric vehicle autonomy from a first level of autonomy to a second level of autonomy based at least in part on a detected signal latency value.

2. The method of claim 1, further comprising:
   providing, via the user interface associated with the first electric vehicle, one or more selectable options for transition from the first electric vehicle to a third electric vehicle along the travel route; and
   determining the travel route to the charging station based at least in part on a user input indicative of vehicle transfer.

3. The method according to claim 1, wherein the first electric vehicle comprises at least two selectable options for the level of autonomy, the at least two selectable options comprising a full autonomous mode and a semi-autonomous mode.

4. The method according to claim 1, wherein selecting the charging station comprises:
receiving, via the user interface associated with the first electric vehicle, a first input indicative of a level of human control for navigating the first electric vehicle and information about cargo to be transported with the first electric vehicle; and
determining the travel route to the charging station based at least in part on the first input.

5. The method according to claim 4, wherein the first input further comprises information indicative of one or more of a travel distance minimization option, a travel time minimization option, and a vehicle transfer minimization option.

6. The method according to claim 1, wherein the trip characteristics data associated with the second electric vehicle comprise one or more of geographic location, destination information, and route plan information.

7. The method according to claim 1, wherein determining the charging station for recharging the first electric vehicle further comprises:
receiving a recharging capacity estimation for recharging one or more of the first electric vehicle and the second electric vehicle at a future period of time;
predicting a future demand for electric vehicles at the charging station; and
selecting, based at least in part on the recharging capacity estimation and trip characteristics associated with the second electric vehicle, the charging station for recharging the first electric vehicle.

8. An electric scooter comprising:
a computer-driven autonomous navigation controller configured to:
receive trip characteristics data associated with a second electric scooter, the trip characteristics data comprising information associated with the second electric scooter comprising one or more of a scooter location, a trip destination, and a route plan, wherein the first electric scooter and the second electric scooter are different;
select, based at least in part on the trip characteristics data associated with the second electric scooter and at least one route optimization option associated with the electric scooter, a charging station of a plurality of charging stations for recharging an onboard power cell based at least in part on instructions received from a remote server;
receive, via a user interface, a second input indicative of a payload maximization option, a power consumption option and a level of autonomy;
determine a travel route to the charging station;
change the level of autonomy from a first level of autonomy to a second level of autonomy based at least in part on a detected signal latency value; and
navigate the electric scooter to the charging station along the travel route.

9. The electric scooter of claim 8, wherein the autonomous navigation controller is further configured to:
provide, via the user interface, one or more selectable options for rider transition from the electric scooter to another electric scooter along the travel route; and
determine, based at least in part on a user input indicative of vehicle transfer, the travel route to the charging station.

10. The electric scooter according to claim 8, wherein the electric scooter includes at least two selectable options for the level of autonomy, the at least two selectable options comprising a full autonomous mode and a semi-autonomous mode.

11. The electric scooter according to claim 8, wherein the autonomous navigation controller is further configured to:
receive, via the user interface, a first input indicative of a level of human control for navigating the electric scooter and information about cargo to be transported with the electric scooter; and
determine, based at least in part on the first input, the travel route to the charging station.

12. The electric scooter according to claim 11, wherein the first input further comprises information indicative of one or more of a travel distance minimization option, a travel time minimization option, and a vehicle transfer minimization option.

13. The electric scooter according to claim 8, wherein the trip characteristics data associated with the second electric scooter comprise one or more of geographic location, destination information, and route plan information.

14. The electric scooter according to claim 8, wherein the autonomous navigation controller is further configured to:
receive a recharging capacity estimation for the second electric scooter at a future period of time;
predict a future demand for electric vehicles at the charging station; and
select the charging station for recharging the onboard power cell based at least in part on the recharging capacity estimation and trip characteristics associated with the second electric scooter.

15. A computer-implemented method comprising:
providing, to a control module of a first electric vehicle, trip characteristics data associated with a second electric vehicle, the trip characteristics data comprising information associated with the second electric vehicle comprising one or more of a vehicle location, a trip destination, and a route plan, wherein the first electric vehicle and the second electric vehicle are different;
selecting, based at least in part on the trip characteristics data associated with the second electric vehicle and at least one route optimization option associated with the first electric vehicle, a charging station of a plurality of charging stations for recharging the first electric vehicle based at least in part on instructions received from a remote server;
receiving, via a user interface, a second input indicative of a payload maximization option, a power consumption option and a level of autonomy;
determining a travel route to the charging station;
changing the level of autonomy from a first level of autonomy to a second level of autonomy based at least in part on a detected signal latency value; and
transmitting navigation information for navigating the first electric vehicle to the charging station along the travel route using an autonomous vehicle navigation system associated with the control module.

* * * * *